Dec. 4, 1951  O. E. VICE  2,577,549
FISHING SINKER
Filed May 22, 1950
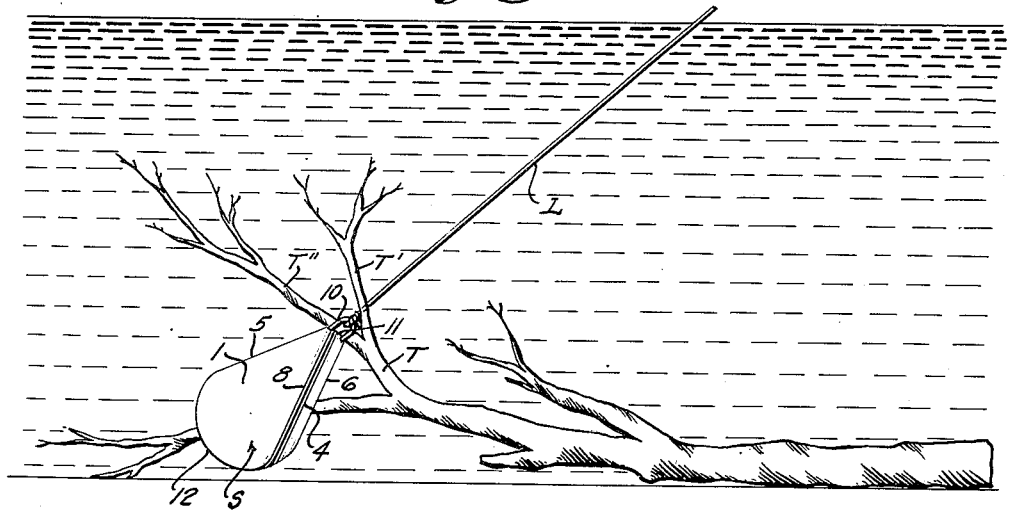
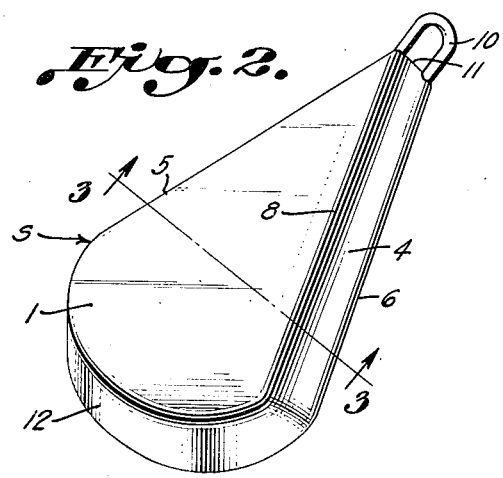
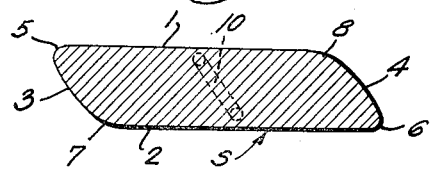
INVENTOR
ORA E. VICE
BY *Samuel Selowitz*
ATTORNEY / Patented Dec. 4, 1951

2,577,549

UNITED STATES PATENT OFFICE 2,577,549

FISHING SINKER

Ora E. Vice, Middletown, Ohio

Application May 22, 1950, Serial No. 163,376

2 Claims. (Cl. 43—43.1)

This invention relates to a fishing sinker adapted for attachment to fishing tackle of all types.

It is the object of the present invention to provide a sinker for attachment to fishing tackle which is simple and economical in construction and which is easily disengageable from any obstructions which may be encountered thereby in the course of trolling, casting or any other fishing activities.

It is a further object of the invention to provide a sinker of rugged construction with which may be cast integrally an attaching loop or eye to obtain a sinker body which is easily attachable to a fishing line and which is freely traversable through waters replete with obstructions of all types without the possibility of the sinker becoming entangled therewith.

The invention proceeds upon the principle of providing a sinker formed as a substantially flat body of generally tear-drop configuration, which is provided with an apex whereat a loop or eye is formed for the attachment of fishing tackle thereto, with camming edges running from the apex to impart a turning movement to the sinker when the same meets with obstructions formed by rocks, timbers or plant growth, so that the sinker may be turned about the apex as an axis to enable it to slide easily over such obstacles or to present its minimum dimensions to any constricting passageways in order that the same may be pulled therethrough without breakage of the fishing line or loss of the sinker therefrom.

Other objects and purposes will appear from the detailed description of the invention following hereinafter, taken in conjunction with the accompanying drawing, wherein Fig. 1 is a perspective view showing the sinker in operation as the same is pulled past a fallen tree presenting a forked obstruction to the sinker;

Fig. 2 is a perspective view of the sinker on an enlarged scale; and

Fig. 3 is a sectional view along line 3—3 of Fig. 2.

As shown in the drawings, the sinker S is adapted to be attached to a fishing line or leader L by means of the loop or eye 10 which is cast integrally into the apex end 11 of the sinker. The opposite end of the sinker is formed with a rounded curvature to give the sinker a substantially tear-drop configuration, although the contour of this end may be varied from the one specifically illustrated in the preferred embodiment.

The sinker is formed of heavy metal, as is known in the art, such as lead, and consists of a substantially flat body defined by substantially parallel top and botom surfaces 1 and 2 of generally tear-drop symmetrical configuration and side edge surfaces 3 and 4 converging to form an apex 11. The edge 3 extends from the rounded corner 5 of wall 1 at an acute angle and merges smoothly into the opposite wall 2 with the more rounded curvature 7 at an obtuse angle. Likewise the edge 4 of the sinker extends from the rounded corner 6 of the wall 2 at an acute angle and merges into wall 1 by a more smoothly rounded curvature 8 at an obtuse angle.

The hook or hairpin loop 10 is disposed angularly with respect to the opposing walls 1 and 2, and the plane of this loop is substantially coextensive with both of the edges 3 and 4 at their junction line at the apex of the sinker body, the legs of the loop 10 being embedded in the body of the sinker at the apex thereof along the lines of the acute angles at 5 and 6. This is shown in Fig. 3 wherein the inclination of the plane of the loop 10 is in substantial parallelism with the edges 3 and 4, and in effect, the legs of the hook 10 are in the same plane as a line connecting the apices of the top and bottom surfaces 1 and 2. This construction makes possible a turning of the sinker when the latter is pulled against an obstruction by virtue of the action of either or both of the camming edges against the obstruction, whereupon the same is turned into a position for clearance through any constriction which is defined by the obstructing surfaces. Thus, if the line L pulls the sinker S against the forked branches of the tree T, as shown in Fig. 1, the sinker is turned by the action of the camming edge 4 against the branch T', which may be supplemented by the action of the camming edge 3 against the branch T'', if the latter edge also encounters the obstruction at the same time as does the edge 4. The same turning movement is imparted to the sinker when the loop 10 is pulled against rocks, timbers or other impediments which have clearing passages adjacent thereto for the passage of the sinker if only the same were presented in the right position for traverse through such passages. The camming edges impart the necessary rotary movements to the sinker body to present its minimal dimensions for passage through such constrictions. The turning motions imparted to the sinker also facilitate its gliding movement over any physical obstructions encountered thereby with least possibility of entanglement or engagement therewith.

The tear-drop or streamlined outline of the sinker gives rise to less drag thereby on the tackle when the latter is pulled against the current. This feature of the pointed and smoothly curved sinker helps considerably in landing a fish in a swift current.

While I have described my invention as embodied in a specific form and as operating in a specific manner for purposes of illustration, it should be understood that I do not limit my invention thereto, since various modifications will suggest themselves to those skilled in the art without departing from the spirit of my invention, the scope of which is set forth in the annexed claims.

I claim:

1. A fishing sinker comprising a substantially flat body having substantially parallel top and bottom surfaces of generally tear-drop symmetrical configuration and side edge surfaces converging to form an apex, the side edge surfaces being angularly disposed relative to the top and bottom surfaces with one of said side edge surfaces disposed at an actue angle to said top surface and the other side edge surface being disposed at an obtuse angle to said top surface, said side edge surfaces being slightly rounded and merging smoothly with the top and bottom surfaces and forming camming surfaces acting to rotate said body about its longitudinal axis when the apex strikes against an obstruction, and a line connecting eye disposed at the apex of said body.

2. A fishing sinker as set forth in claim 1 wherein said eye is in the form of a hairpin hook embedded in said body at its apex with the legs of the hook in the same plane as a line connecting the apices of the top and bottom surfaces.

ORA E. VICE.

REFERENCES CITED

The following references are of record in the file of this patent:

UNITED STATES PATENTS

| Number | Name | Date |
| --- | --- | --- |
| 769,356 | Reis | Sept. 6, 1904 |
| 1,897,291 | Andrews | Feb. 14, 1933 |
| 2,187,991 | Tyler | Jan. 23, 1940 |